United States Patent Office 3,536,678
Patented Oct. 27, 1970

3,536,678
PRODUCTION OF RUBBERY ETHYLENE COPOLYMERS
Edward William Duck, Hythe, and David Page Grieve, Holbury, England, assignors to The International Synthetic Rubber Company Limited, Southampton, England, a corporation of the United Kingdom
No Drawing. Filed Jan. 12, 1966, Ser. No. 520,094
Claims priority, application Great Britain, Jan. 18, 1965, 2,084/65
Int. Cl. C08f 15/40
U.S. Cl. 260—80.78         6 Claims

ABSTRACT OF THE DISCLOSURE

A process for the copolymerisation of ethylene with an alpha olefin in the presence or absence of minor amounts of a third monomer, being a non-conjugated diolefin, to a rubber-like product in the presence of a catalyst comprising an organic compound of vanadium not containing a halogen directly attached to the vanadium atom, a halide compound selected from the group comprising tin tetrachloride, gallium trichloride and boron trifluoride etherate, and an alkyl or aryl organometallic compound of a metal from groups 1–3 of Mendeléeff's periodic table, such compound not possessing a halogen attached directly to the metal atom, the proportion of the catalyst components being present in catalytically effective amounts.

---

This invention relates to the production of rubbery ethylene copolymers.

According to the present invention, we provide a process for the copolymerisation of ethylene with an alpha olefin in the presence or absence of minor amounts of a third monomer, being a non-conjugated diolefin, to a rubber-like product in the presence of a catalyst comprising:
  (a) An organic compound of vanadium not containing a halogen directly attached to the vanadium atom,
  (b) Tin tetrachloride or gallium trichloride or $BF_3$ etherate, and
  (c) An alkyl or aryl organo-metallic compound of a metal from groups 1–3 of Mendeléeff's periodic table, such compound not possessing a halogen attached directly to the metal atoms, e.g. lithium butyl, aluminum triethyl.

All three components in this catalyst combination are necessary and no two components will polymerise or copolymerise ethylene with other unsaturated compounds, to any significant extent. Preferably component (a) (the vanadium compound) and component (b) (the tin, gallium or boron halide) are brought together first and then component (c) (the group 1–3, organo-metallic compound) introduced. It is perhaps better not to add the third component—(c)—until after the monomers have been introduced into the system. The mole ratios of catalyst components $b:c$ and $a:b$ may be varied in the range 1:10 and 10:1.

The process is carried out within the temperature range —30° C. to +50° C., and is preferentially carried out in the presence of an anhydrous hydrocarbon solvent such as hexane or benzene.

Suitable alpha olefins with which ethylene may be copolymerised are propylene, butene-1, n-hexene-1, octene-1, decene-1 and dodecene-1. The non-conjugated diolefin comprising the third monomer, if such is present, may be dicyclopentadiene, cyclo-octadiene, trivinylcyclohexane or hexadiene 1,4.

As examples of suitable organic compounds of vanadium which may comprise component (a) of the catalyst, mention is made of vanadium di-isopropyl silicylate, vanadyl tributoxyester; vanadyl tri-isopropoxy ester; vanadyl tri-ethoxyester and vanadyl tri-isopropxy ester; vanadyl tri-ethoxyester and vanadyl acetylacetonate. Besides lithium butyl and aluminum triethyl, lithium phenyl; aluminum tri-isobutyl or aluminum di-isobutyl hydride are also particularly suitable as component (c) of the catalyst.

The following examples serve to illustrate the present invention:

EXAMPLE 1

A catalyst prepared from triethyl aluminum and vanadium di-isopropyl salicylate was charged to anhydrous hexane (400 mls.) in a 1 litre reaction flask. A mixture of pure dry ethylene and propylene was passed through the catalyst solution for a period of 1 hour. A series of experiments were carried out in which the reaction temperature and the Al/V ratio were varied. In no experiment did the yield of polymer exceed 0.01 gm.

EXAMPLE 2

A catalyst mixture was prepared from vanadium di-isopropyl silicylate (0.8 mmoles), boron trifluoride etherate (2.6 mmoles) and triethyl aluminum (8 mmoles) in anhydrous hexane, in the presence of ethylene and propylene, in a 1 litre reaction vessel. Polymerisation was carried out at room temperature and normal atmospheric pressure. Ethylene and propylene in the ratio 40/60 were passed through the catalyst solution for a period of 1 hour. A yield of 3 gms. of high molecular weight copolymer was obtained.

EXAMPLE 3

The boron trifluoride etherate in the catalyst mixture in Example 2 was replaced by tin tetrachloride. The polymerisation procedure was exactly the same as that in Example 2. In this case, the product was a soluble rubber copolymer of high molecular weight. The ratios of aluminum to tin and vanadium to aluminum were varied and the results are as follows:

Polymerisation temperature, 20° C.
Time, 1 hour
Ethylene/propylene feed ratio, 40/60

| No. | Vanadium di-isopropyl salicylate, mmoles | Tin tetra-chloride, mmoles | Triethyl aluminum, mmoles | V/Al | Al/Sn | Yield, gm. |
|---|---|---|---|---|---|---|
| 1 | 1 |   | 20 | 0.05 |   | Nil. |
| 2 | 2 | 20 |   |   |   | Nil. |
| 3 |   | 10 | 20 |   | 2 | Nil. |
| 4 | 1 | 2 | 20 | 0.05 | 10 | 1. |
| 5 | 1 | 5 | 20 | 0.05 | 4 | 8. |
| 6 | 1 | 10 | 10 | 0.1 | 1 | Nil. |

What is claimed is:
1. A process for the copolymerisation of ethylene with an alpha olefin in the presence or absence of minor amounts of a third monomer, being a non-conjugated diolefin, to a rubber-like product in the presence of a catalyst comprising:
  (a) an organic compound of vanadium not containing a halogen directly attached to the vanadium atom,
  (b) a halide compound selected from the group comprising tin tetrachloride, gallium trichloride and boron trifluoride etherate, and
  (c) an alkyl or aryl organo-metallic compound of a metal from groups 1–3 of Mendeléeff's Periodic Table, such compound not possessing a halogen attached directly to the metal atom,
the proportion of the catalyst components being present in catalytically effective amounts.

2. A process for the copolymerisation of ethylene with an alpha olefin in the presence or absence of minor amounts of a third monomer, being a non-conjugated diolefin, to a rubber-like product in the presence of a catalyst comprising:

(a) a vanadium compound selected from the group comprising vanadium di-isopropyl salicylate, vanadyl tributoxyester, vanadyl triisopropoxy ester, vanadyl triethoxyester and vanadyl acetylacetonate;

(b) a halide compound selected from the group comprising tin tetrachloride, gallium trichloride and boron trifluoride etherate, and (c) an organo-metallic compound selected from the group comprising lithium butyl, aluminum triethyl, lithium phenyl, aluminum tri-isobutyl and aluminum di-isobutyl hydride, the proportion of the catalyst components being present in catalytically effective amounts, and the mole ratios of the catalyst components $a:b$ being in the range of about 1:2 to 1:10 and of $b:c$ being in the range of about 1:3 to 1:10.

3. A process according to claim 2 wherein the alpha olefin with which the ethylene is copolymerised is selected from the group comprising propylene, butene-1, n-hexane-1, octene-1, decene-1 and dodecene-1.

4. The process of copolymerising ethylene with an alpha olefin selected from the group comprising propylene, butene-1, n-hexene-1, octene-1, decene-1 and dodecene-1 and if desired a third monomer selected from the group comprising dicyclopentadiene, cyclooctadiene, trivinylcyclohexane or hexadiene 1,4, in the presence of a catalyst comprising:

(a) a vanadium compound selected from the group comprising vanadium di-isopropyl salicylate, vanadyl tri-butoxyester, vanadyl tri-isopropoxyester, vanadyl tri-ethoxyester and vanadyl acetylacetonate;

(b) a halide compound selected from the group comprising tin tetrachloride, gallium trichloride and boron trifluoride etherate, and (c) an organo-metallic compound selected from the group comprising lithium butyl, aluminum triethyl, lithium phenyl, aluminum isobutyl and aluminum di-isobutyl hydride, the copolymerisation being performed at a temperature in the range of from −30° C. to +150° C. in the presence of an anhydrous hydrocarbon solvent, the proportion of the catalyst components being present in catalytically effective amounts, and the mole ratios of the catalyst components $a:b$ being in the range of about 1:2 to 1:10 and of $b:c$ being in the range of about 1:3 to 1:10.

5. The process of claim 1 wherein the mole ratios of $b:c$ of the catalyst components being in the range 1:10 to 10:1.

6. The process of claim 1 wherein the mole ratios of the catalyst components $a:b$ being in the range of about 1:2 to 1:10 and of $b:c$ being in the range of about 1:3 to 1:10.

References Cited

UNITED STATES PATENTS

| 3,166,538 | 1/1965 | Olson | 260—88.2 |
| 3,170,907 | 2/1965 | Ueda et al. | 260—93.7 |
| 3,073,811 | 1/1963 | Natta | 260—93.7 |

OTHER REFERENCES

Chemical Abstracts, vol. 61: 4509e (1964).

JOSEPH L. SCHOFER, Primary Examiner

R. S. BENJAMIN, Assistant Examiner

U.S. Cl. X.R.

260—88.2